US012485928B2

(12) United States Patent
Imazu et al.

(10) Patent No.: US 12,485,928 B2
(45) Date of Patent: Dec. 2, 2025

(54) AUTONOMOUS TRAVELING SYSTEM, AUTONOMOUS TRAVELING METHOD, AND STORAGE MEDIUM

(71) Applicant: TOYOTA JIDOSHA KABUSHIKI KAISHA, Toyota (JP)

(72) Inventors: Takanori Imazu, Susono (JP); Yoshiki Fukada, Susono (JP); Ryuji Okamura, Gotemba (JP); Takashi Hayashi, Mishima (JP); Kohki Baba, Susono (JP); Satoshi Omi, Ebina (JP); Akihiro Kusumoto, Susono (JP); Yuta Kataoka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 17/948,732

(22) Filed: Sep. 20, 2022

(65) Prior Publication Data
US 2023/0114453 A1   Apr. 13, 2023

(30) Foreign Application Priority Data

Oct. 12, 2021 (JP) ................................ 2021-167562

(51) Int. Cl.
*B60W 60/00* (2020.01)
(52) U.S. Cl.
CPC ............................. *B60W 60/00253* (2020.02)
(58) Field of Classification Search
CPC ..... B60W 60/00253; B60W 2540/041; B60W 50/0097; G06Q 10/02; G06Q 10/08
USPC ......................................................... 701/23
See application file for complete search history.

(56) References Cited

U.S. PATENT DOCUMENTS

| | | | | |
|---|---|---|---|---|
| 5,878,368 A * | 3/1999 | DeGraaf | .......... | G08G 1/096861 73/178 R |
| 10,126,138 B1 * | 11/2018 | Farmer | .................. | G06Q 50/40 |
| 10,152,053 B1 * | 12/2018 | Smith | ................ | G01C 21/3438 |
| 10,268,192 B1 * | 4/2019 | Wengreen | ............ | G05D 1/0088 |
| 12,057,017 B2 * | 8/2024 | Sakurada | ........ | B60W 60/00253 |
| 12,214,807 B2 * | 2/2025 | Vora | ........................ | G08G 1/202 |
| 2009/0326991 A1 * | 12/2009 | Wei | ........................ | G06Q 10/02 705/5 |
| 2015/0006005 A1 * | 1/2015 | Yu | .......................... | G05D 1/667 701/22 |
| 2017/0267233 A1 * | 9/2017 | Minster | ................. | B60W 30/06 |
| 2018/0321674 A1 * | 11/2018 | Chase | .................... | G05D 1/247 |
| 2018/0376357 A1 * | 12/2018 | Tavares Coutinho | ...................... | H04W 64/003 |
| 2019/0011926 A1 * | 1/2019 | Konishi | ............. | G01C 21/3476 |
| 2019/0017839 A1 * | 1/2019 | Eyler | ................. | G01C 21/3647 |

(Continued)

FOREIGN PATENT DOCUMENTS

| | | |
|---|---|---|
| JP | 2018-163117 A | 10/2018 |
| JP | 2020-86930 A | 6/2020 |
| JP | 2020-198013 A | 12/2020 |

*Primary Examiner* — Tuan C To
*Assistant Examiner* — Dominick Mulder
(74) *Attorney, Agent, or Firm* — Sughrue Mion, PLLC

(57) ABSTRACT

When an autonomous vehicle is caused to depart from a current position to a pickup location, a waiting location for temporarily parking the autonomous vehicle is set between the current position and the pickup location. The autonomous vehicle is autonomously driven from the current position to the waiting location, temporarily parked at the waiting location, and then autonomously driven to the pickup location.

11 Claims, 17 Drawing Sheets

(56) References Cited

U.S. PATENT DOCUMENTS

| | | |
|---|---|---|
| 2019/0137290 A1* | 5/2019 | Levy ..................... B60Q 1/507 |
| 2019/0228664 A1* | 7/2019 | Seki ..................... G06Q 10/047 |
| 2019/0244317 A1* | 8/2019 | Seki ..................... G05D 1/0011 |
| 2020/0097007 A1* | 3/2020 | Dyer ..................... G05D 1/0212 |
| 2020/0166354 A1 | 5/2020 | Ikemoto et al. |
| 2020/0174494 A1* | 6/2020 | Lessels ................ G06Q 10/083 |
| 2020/0286021 A1* | 9/2020 | Luckay ............ G06Q 10/08355 |
| 2021/0331702 A1* | 10/2021 | Kim ................... G01C 21/3617 |
| 2022/0057223 A1* | 2/2022 | Schramm ............ G01C 21/3492 |
| 2022/0097734 A1* | 3/2022 | Limaye ................. G06V 20/56 |
| 2022/0164910 A1* | 5/2022 | Gu ......................... G06Q 30/08 |
| 2022/0194362 A1* | 6/2022 | Ueki ............... B60W 60/00253 |
| 2022/0415173 A1* | 12/2022 | Agarwal .......... G08G 1/096725 |
| 2023/0168098 A1* | 6/2023 | Ueno ................. G01C 21/3492 |
| | | 701/24 |

* cited by examiner

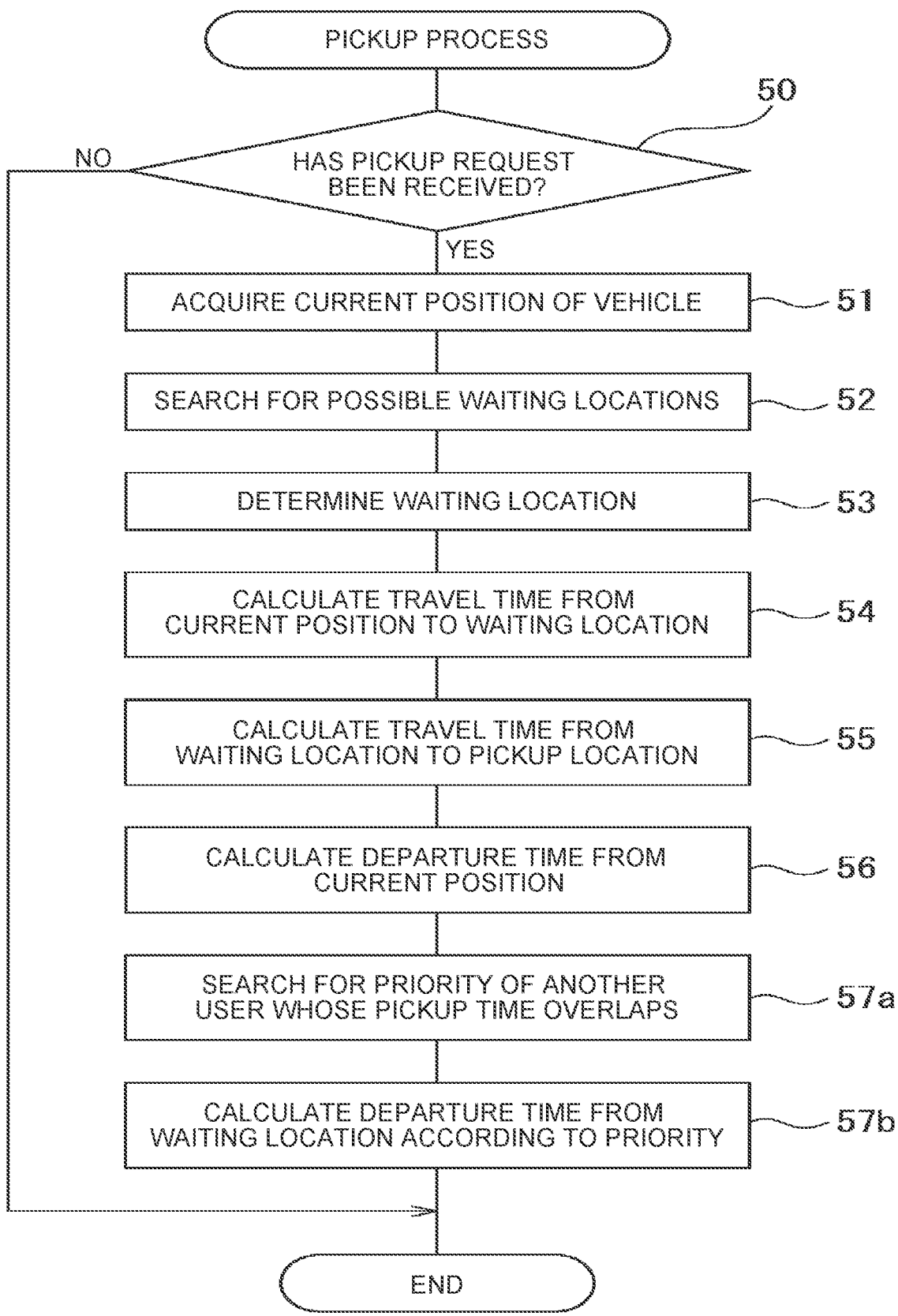

AUTONOMOUS TRAVELING SYSTEM, AUTONOMOUS TRAVELING METHOD, AND STORAGE MEDIUM

CROSS-REFERENCE TO RELATED APPLICATION

This application claims priority to Japanese Patent Application No. 2021-167562 filed on Oct. 12, 2021, incorporated herein by reference in its entirety.

BACKGROUND

1. Technical Field

The present disclosure relates to an autonomous traveling system, an autonomous traveling method, and a storage medium.

2. Description of Related Art

An autonomous traveling system is known in which when an owner of an autonomous vehicle moves to a location away from the autonomous vehicle after getting off the autonomous vehicle, the autonomous vehicle is moved to a pickup location desired by the owner (see, for example, Japanese Unexamined Patent Application Publication No. 2018-163117 (JP 2018-163117 A)).

SUMMARY

However, in this case, there is a problem that when a traffic jam occurs between a parking location of an autonomous vehicle that the owner gets off and the pickup location, the waiting time of the owner becomes long.

Therefore, the present disclosure provides a vehicle autonomous traveling system including an acquisition unit that acquires a pickup location of a user by an autonomous vehicle; a waiting location setting unit that sets a waiting location for temporarily parking the autonomous vehicle between a current position and the pickup location when the autonomous vehicle is moved from the current position to the pickup location; and an autonomous driving management unit that autonomously drives the autonomous vehicle from the current position to the waiting location, temporarily parks the autonomous vehicle at the waiting location, and then autonomously drives the autonomous vehicle to the pickup location.

Further, the present disclosure provides a vehicle autonomous traveling method. The vehicle autonomous traveling method includes
  acquiring a pickup location of a user by an autonomous vehicle;
  setting a waiting location for temporarily parking the autonomous vehicle between a current position and the pickup location when the autonomous vehicle is moved from the current position to the pickup location; and
  autonomously driving the autonomous vehicle from the current position to the waiting location, temporarily parking the autonomous vehicle at the waiting location, and then autonomously driving the autonomous vehicle to the pickup location.

Further, the present disclosure provides a storage medium storing a program that causes a computer to perform functions including:
  acquiring a pickup location of a user by an autonomous vehicle;
  setting a waiting location for temporarily parking the autonomous vehicle between a current position and the pickup location when the autonomous vehicle is moved from the current position to the pickup location; and
  autonomously driving the autonomous vehicle from the current position to the waiting location, temporarily parking the autonomous vehicle at the waiting location, and then autonomously driving the autonomous vehicle to the pickup location.

It is possible to reduce the waiting time of the autonomous vehicle at the pickup location.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:
FIG. 17 is a flowchart for performing a pickup process in the fourth embodiment.

DETAILED DESCRIPTION OF EMBODIMENTS

Figure 1:
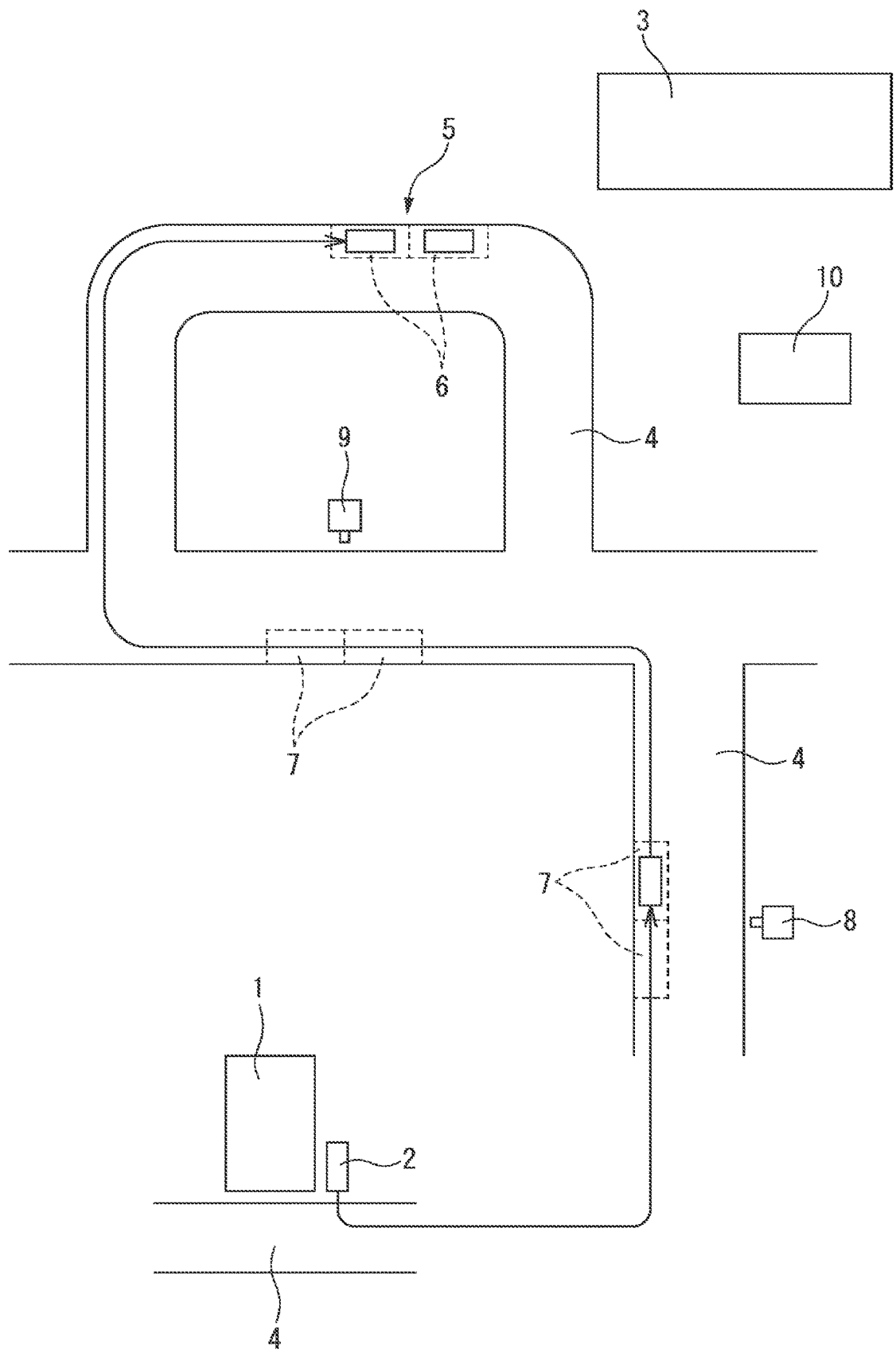
FIG. 1 is a diagram graphically illustrating a road and a parking space.

First, with reference to FIG. 1, an example in which an autonomous vehicle parked at home is moved to a station is shown to describe the outline of an autonomous traveling system according to the present disclosure. With reference to FIG. 1, the numeral 1 indicates a home, the numeral 2 is an autonomous vehicle parked at the home 1, the numeral 3 indicates a station, the numeral 4 indicates a road, and the numeral 5 is a boarding and alighting location of the autonomous vehicle near the station 3. FIG. 1 shows a case where there is a stop space 6 for two vehicles in the boarding and alighting location 5, the stop space 6 being a space where the autonomous vehicle can be temporarily stopped for the user to get on and off the autonomous vehicle, although the vehicle cannot be parked. In this example, this boarding and alighting location 5 is used as a pickup location for the autonomous vehicle to pick up the user, and therefore, in the following description, this boarding and alighting location is referred to as a pickup location 5.

Figure 2:
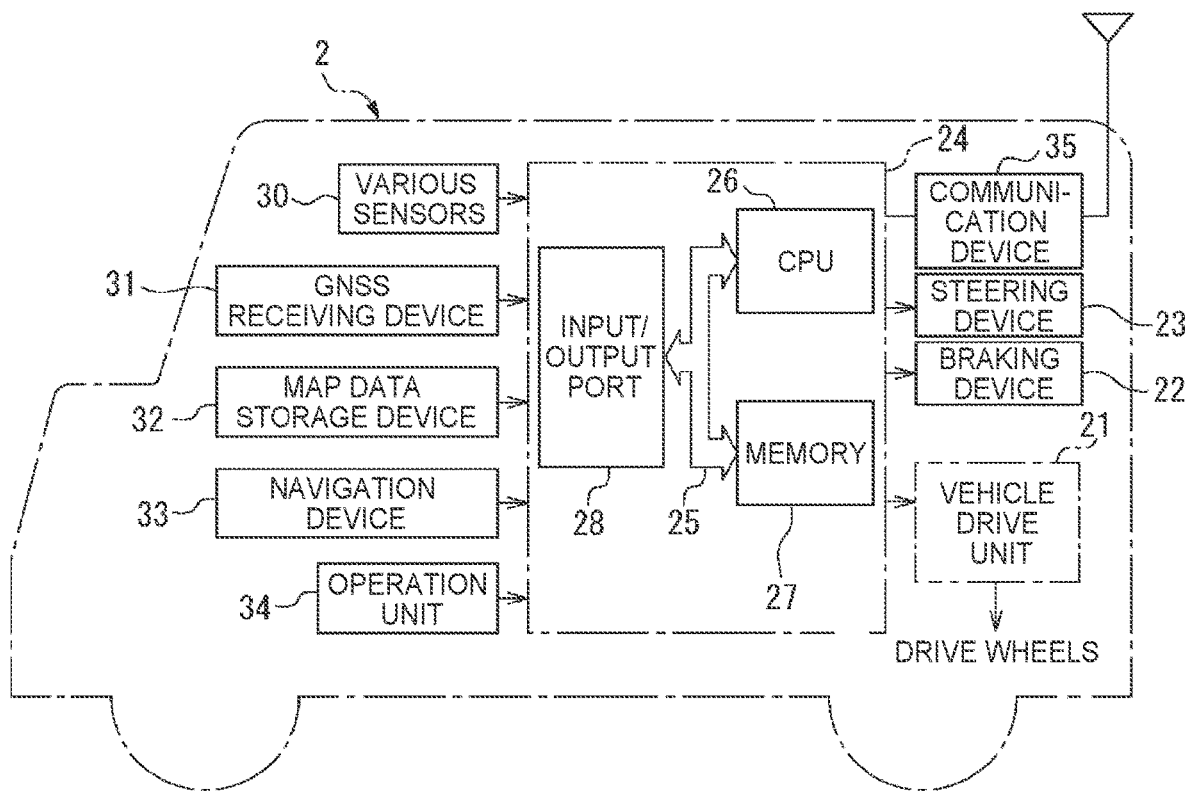
FIG. 2 is a diagram graphically illustrating a vehicle.

Next, with reference to FIG. 2, the autonomous vehicle 2 having an autonomous driving function and an autonomous parking function will be described. With reference to FIG. 2, the numeral 21 indicates a vehicle drive unit for applying a driving force to drive wheels of the autonomous vehicle 2, the numeral 22 indicates a braking device for braking the autonomous vehicle 2, the numeral 23 indicates a steering device for steering the autonomous vehicle 2, and the numeral 24 indicates an electronic control unit mounted in the autonomous vehicle 2. As shown in FIG. 2, the electronic control unit 24 is composed of a digital computer, and includes a central processing unit (CPU: microprocessor) 26, a memory 27 composed of a read-only memory (ROM) and a random access memory (RAM), and an input/output port 28 that are connected to each other by a bidirectional bus 25.

As shown in FIG. 2, the autonomous vehicle 2 includes various sensors 30 necessary for the autonomous vehicle 2 to perform autonomous driving and autonomous parking, that is, sensors for detecting the state of the autonomous vehicle 2 and sensors for detecting the periphery of the autonomous vehicle 2. In this case, an acceleration sensor, a speed sensor, and an azimuth angle sensor are used as the sensors for detecting the state of the autonomous vehicle 2, and an on-board camera for capturing images of the front, the side, and the rear of the autonomous vehicle 2, light detection and ranging (LIDAR), a radar, and the like are used as the sensors for detecting the periphery of the autonomous vehicle 2. Further, the autonomous vehicle 2 is provided with a Global Navigation Satellite System (GNSS) receiving device 31, a map data storage device 32, a navigation device 33, and an operation unit 34 for performing various operations. The GNSS receiving device 31 can detect the current position of the autonomous vehicle 2 (for example, the latitude and longitude of the autonomous vehicle 2) based on the information obtained from a plurality of artificial satellites. Thus, the current position of the autonomous vehicle 2 can be acquired by the GNSS receiving device 31. As the GNSS receiving device 31, for example, a global positioning system (GPS) receiving device is used.

On the other hand, the map data storage device 32 stores map data and the like necessary for the autonomous vehicle 2 to perform autonomous driving. Further, the operation unit 34 is provided with an operation panel necessary for autonomous driving or the like, and when a destination is input on the operation panel, a travel route for the autonomous vehicle 2 is searched using the navigation device 33. These various sensors 30, the GNSS receiving device 31, the map data storage device 32, the navigation device 33, and the operation unit 34 are connected to the electronic control unit 24.

With reference to FIG. 2, in the embodiment according to the present disclosure, the vehicle drive unit 21 is composed of an electric motor driven by a secondary battery or an electric motor driven by a fuel cell. Driving of the drive wheels is controlled by these electric motors in accordance with an output signal from the electronic control unit 24. Further, the braking control of the autonomous vehicle 2 is executed by the braking device 22 in accordance with the output signal from the electronic control unit 24. The steering control of the autonomous vehicle 2 is executed by the steering device 23 in accordance with the output signal from the electronic control unit 24.

Figure 3:
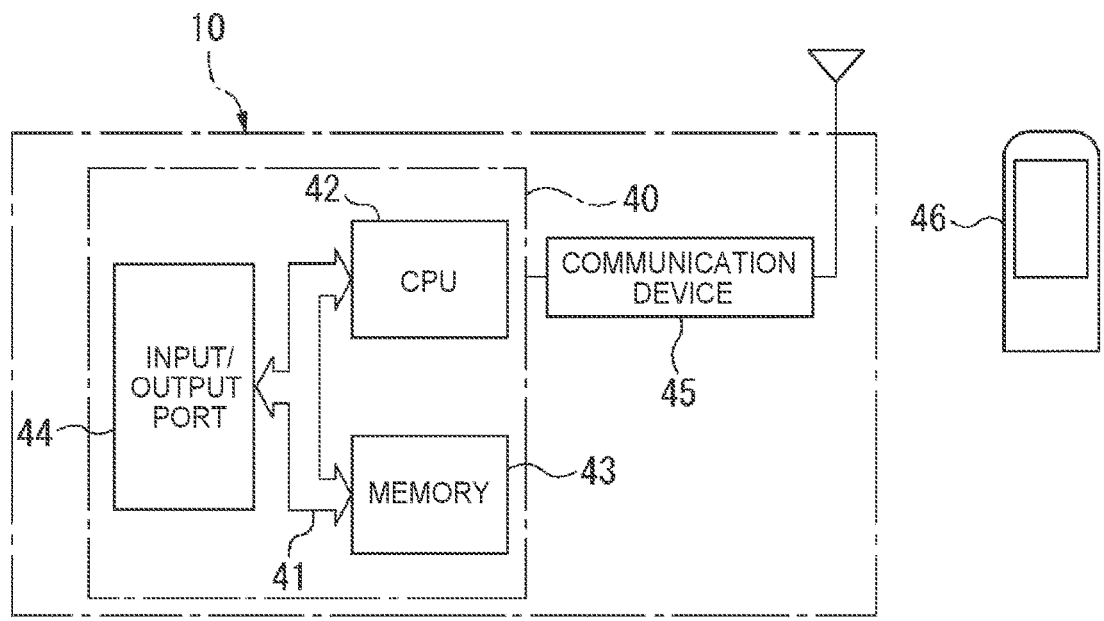
FIG. 3 is a diagram graphically illustrating a traveling management server.

On the other hand, FIG. 3 shows a travel control server 10 for managing the travel of the autonomous vehicle 2. As shown in FIG. 3, an electronic control unit 40 is installed in the travel control server 10. The electronic control unit 40 is composed of a digital computer, and includes a CPU (microprocessor) 42, a memory 43 composed of a ROM and a RAM, and an input/output port 44 that are connected to each other by a bidirectional bus 41. Further, a communication device 45 for communicating with the autonomous vehicle 2 is also installed in the travel control server 10. On the other hand, the autonomous vehicle 2 is equipped with a communication device 35 for communicating with the travel control server 10. Further, FIG. 3 shows a mobile terminal 46 that is owned by a user who uses a travel control service by the travel control server 10, and that is capable of communicating with the communication device 45 of the travel control server 10 via a communication network. Hereinafter, the user who uses this travel control service is referred to as a user of the autonomous vehicle 2.

With reference to FIG. 3, in the embodiment according to the present disclosure, the vehicle drive unit 21 is composed of an electric motor driven by a secondary battery or an electric motor driven by a fuel cell. Driving of the drive wheels is controlled by these electric motors in accordance with an output signal from the electronic control unit 24. Further, the braking control of the autonomous vehicle 2 is executed by the braking device 22 in accordance with the output signal from the electronic control unit 24. The steering control of the autonomous vehicle 2 is executed by the steering device 23 in accordance with the output signal from the electronic control unit 24.

When the user of the autonomous vehicle 2 sends the autonomous vehicle 2 parked at the home 1 to the pickup location 5, in the example shown in FIG. 1, the user of the autonomous vehicle 2 transmits a pickup request for requesting the travel control server 10 to send the autonomous vehicle 2 parked at the home 1 to the pickup location 5 using the mobile terminal 46. When the travel control server 10 receives the pickup request, the travel control server 10 generates a travel command to the autonomous vehicle 2 such that the autonomous vehicle 2 moves to the pickup location 5. When the autonomous vehicle 2 receives the travel command from the travel control server 10, the autonomous vehicle 2 starts traveling by autonomous driving toward the pickup location 5.

In this case, there is a problem that when the road 4 along which the autonomous vehicle 2 travels from the home 1 to the pickup location 5 is congested, it takes time for the autonomous vehicle 2 to reach the pickup location 5, and the waiting time of the user of the autonomous vehicle 2 becomes long. In this case, when the autonomous vehicle 2 is sent from the home 1 toward the pickup location 5 at an early timing, and the autonomous vehicle 2 is placed in a waiting state near the pickup location 5, instead of directly sending the autonomous vehicle 2 to the pickup location 5, the time required for the autonomous vehicle 2 to reach the pickup location 5 can be shortened, and the waiting time of the user of the autonomous vehicle 2 can be shortened.

Therefore, in the example shown in FIG. 1, using a parking space 7 where the autonomous vehicle 2 can be parked, the parking space 7 being located between the home 1 and the pickup location 5, the autonomous vehicle 2 departing from the home 1 is temporarily parked in the parking space 7 where the autonomous vehicle 2 can be parked. In this case, in addition to map information, the positions of the parking spaces 7 where the autonomous vehicle 2 can be parked are stored in a memory 43 of the electronic control unit 40 of the travel control server 10. Therefore, in the example shown in FIG. 1, an appropriate parking space 7 is searched from the position information of the parking spaces 7 stored in the memory 43. Further, in the example shown in FIG. 1, surveillance cameras 8 and 9 for monitoring the usage state of each parking space 7 are installed, and image data captured by these surveillance cameras 8 and 9 is transmitted to the travel control server 10.

The travel control server 10 determines the usage state of each parking space 7 based on these captured image data, and constantly updates the usage state of each parking space 7 stored in the memory 43. Therefore, in the example shown in FIG. 1, an empty parking space 7 is searched from the information on the parking spaces 7 stored in the memory 43, and the empty parking space 7 is used as a waiting location for the autonomous vehicle 2 In the example shown in FIG. 1, the parking space 7 provided on the side edge of the road 4 is used as the parking space 7, but an empty parking space 7 in the parking lot leading to the road 4 may be used as the parking space 7.

Figure 4:
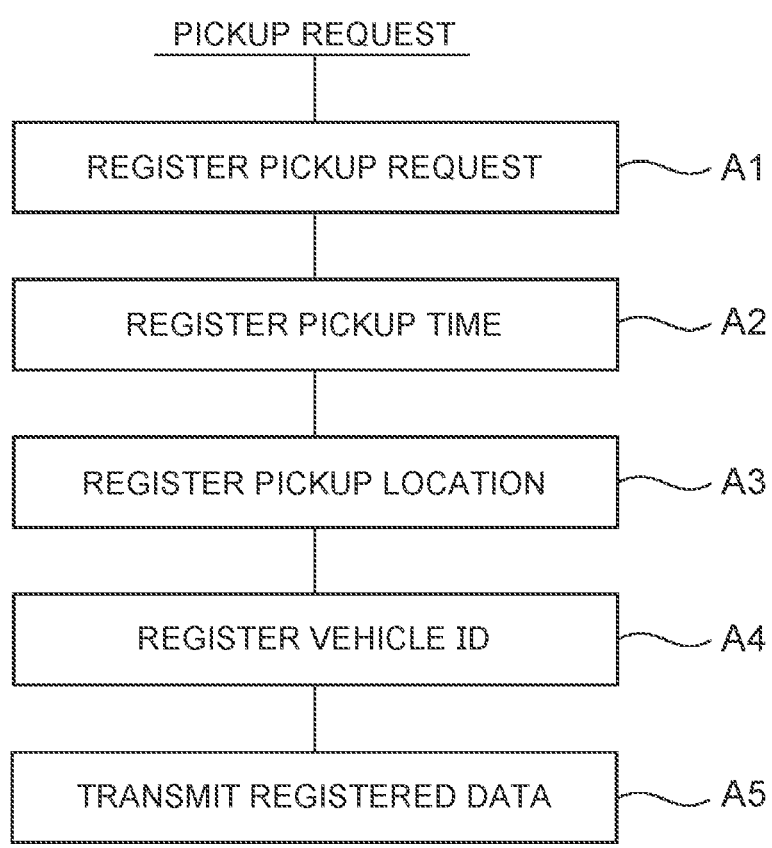
FIG. 4 is a diagram for describing an example of a pickup requesting method in a first embodiment.

Next, a first embodiment according to the present disclosure will be described with reference to FIGS. 4 to 8. FIG. 4 shows an example of a pickup requesting method performed by the user of the autonomous vehicle 2 using the mobile terminal 46. With reference to FIG. 4, on the pickup request screen of the mobile terminal 46, a pickup request is registered as shown in A1, a pickup time is registered as shown in A2, a pickup location is registered as shown in A3, vehicle identification (ID) for identifying the autonomous vehicle 2 of the user is registered as shown in A4, and these registered data are transmitted from the mobile terminal 46 to the travel control server 10 as shown in A5. In this first embodiment, travel of the autonomous vehicle 2 is controlled such that the autonomous vehicle 2 reaches the pickup location at the pickup time.

Figure 5:
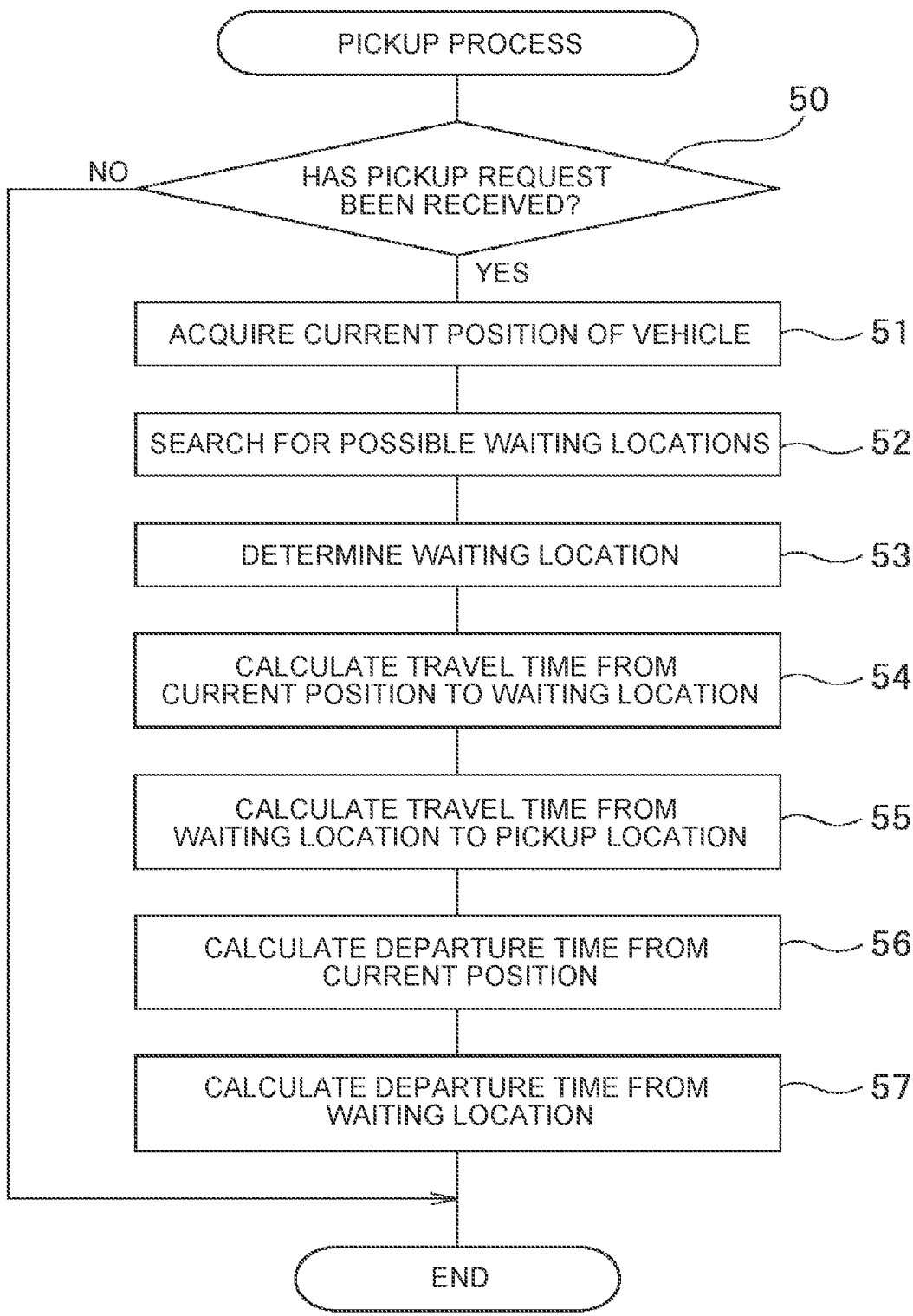
FIG. 5 is a flowchart for performing a pickup process in the first embodiment.

FIG. 5 shows a pickup processing routine that is repeatedly executed by the electronic control unit 40 of the travel control server 10.

With reference to FIG. 5, first, in step 50, it is determined whether the pickup request has been received from the mobile terminal 46. When it is determined that the pickup request has not been received, the processing cycle is terminated. On the contrary, when it is determined that the pickup request has been received, the process proceeds to step 51, and the electronic control unit 40 communicates with the autonomous vehicle 2 of the user, so that the current position of the autonomous vehicle 2 detected in the autonomous vehicle 2 is acquired.

Next, in step 52, based on the position information on the parking space 7 and the information on the usage state of the parking space 7 stored in the memory 43 of the electronic control unit 40 of the travel control server 10, empty parking spaces 7 located between the current position of the autonomous vehicle 2 and the pickup location requested by the user are searched. Next, in step 53, one of the empty parking spaces 7 is determined as a waiting location for the autonomous vehicle 2.

Next, in step 54, based on the map information stored in the memory 43, the travel route of the autonomous vehicle 2 from the current position to the waiting location is determined, and the travel time of the autonomous vehicle 2 from the current position to the waiting location is calculated. Next, in step 55, based on the map information stored in the memory 43, the travel route of the autonomous vehicle 2 from the waiting location to the pickup location is determined, and the travel time of the autonomous vehicle 2 from the waiting location to the pickup location is calculated. Next, in step 56, based on these calculated travel times, the departure time from the current position of the autonomous vehicle 2 is calculated such that the waiting time at the waiting location is set to be, for example, 20 minutes. Next, in step 57, the departure time from the waiting location of the autonomous vehicle 2 is calculated.

Figure 6:
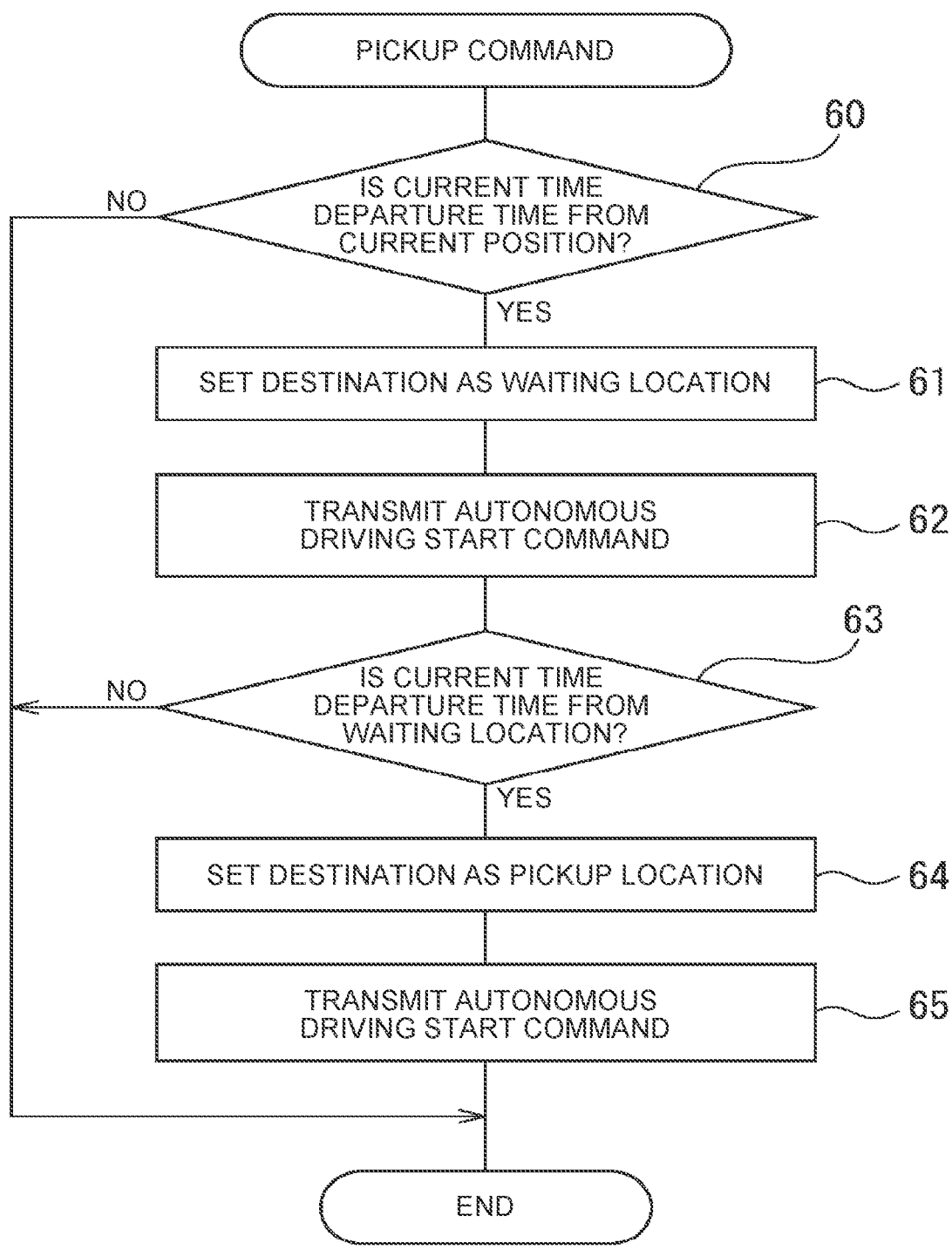
FIG. 6 is a flowchart for generating a pickup command.

FIG. 6 shows a pickup command routine that is repeatedly executed by the electronic control unit 40 of the travel control server 10.

With reference to FIG. 6, first, in step 60, it is determined whether the current time is the calculated departure time from the current position of the autonomous vehicle 2. When it is determined that the current time is not the calculated departure time from the current position of the autonomous vehicle 2, the processing cycle is terminated. On the other hand, when it is determined that the current time is the calculated departure time from the current position of the autonomous vehicle 2, the process proceeds to step 61, and the destination of the autonomous vehicle 2 is set as the waiting location. Next, in step 62, an autonomous driving start command is transmitted to the autonomous vehicle 2. Then, the process proceeds to step 63.

In step 63, it is determined whether the current time is the calculated departure time from the waiting location of the autonomous vehicle 2. When it is determined that the current time is not the calculated departure time from the current position of the autonomous vehicle 2, the processing cycle is terminated. On the contrary, when it is determined that the current time is the calculated departure time from the waiting location of the autonomous vehicle 2, the process proceeds to step 64, and the destination of the autonomous vehicle 2 is set as the pickup location 5. Next, in step 65, an autonomous driving start command is transmitted to the autonomous vehicle 2.

Figure 7:
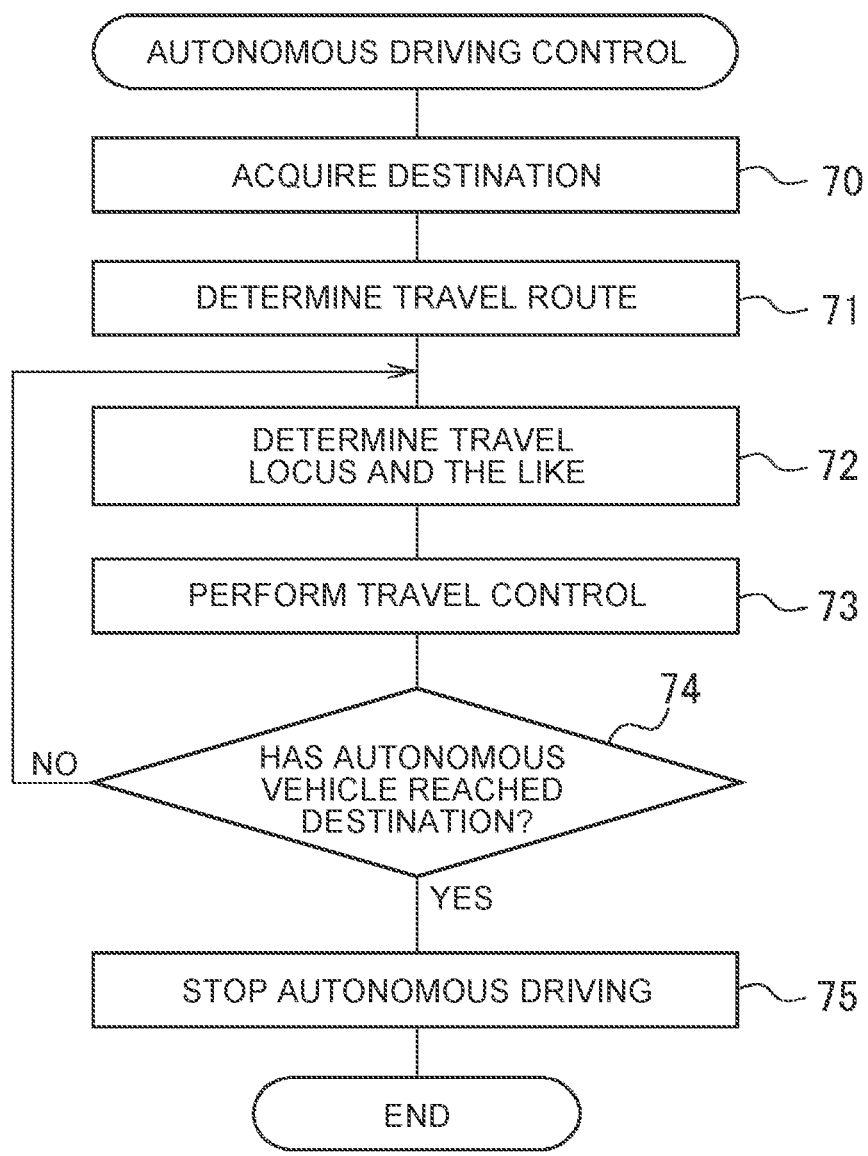
FIG. 7 is a flowchart for performing autonomous driving control.

FIG. 7 shows an autonomous driving control routine executed by the electronic control unit 24 of the autonomous vehicle 2 when the autonomous driving start command is received.

With reference to FIG. 7, first, in step 70, the destination determined by the travel control server 10, that is, the waiting location or the pickup location 5 is acquired. Next, in step 71, based on the destination determined by the travel control server 10 and the current position of the autonomous vehicle 2 acquired by the GNSS receiving device 20, the travel route of the autonomous vehicle 2 from the current position to the destination is determined by the navigation device 33. In this case, the travel route calculated by the travel control server 10 can also be adopted.

Next, in step 72, the travel locus and the travel speed of the autonomous vehicle 2 are determined so as not to contact other vehicles and pedestrians based on the detection result of a sensor such as a camera for capturing an image of the front or the like of the autonomous vehicle 2, a LIDAR, and a radar. Next, in step 73, the travel control of the autonomous vehicle 2 is performed in accordance with the determined travel locus and travel speed. Next, in step 74, it is determined whether the autonomous vehicle 2 has reached the destination, that is, the waiting location or the pickup location 5. When it is determined that the autonomous vehicle 2 has not reached the destination, the process returns to step 72, and the autonomous driving of the autonomous vehicle 2 is continued. On the contrary, when it is determined in step 74 that the autonomous vehicle 2 has reached the destination, that is, the waiting location or the pickup location 5, the process proceeds to step 75 and the autonomous driving of the autonomous vehicle 2 is stopped. As described above, the autonomous vehicle 2 is autonomously driven to the waiting location or the pickup location 5.

Figure 8:
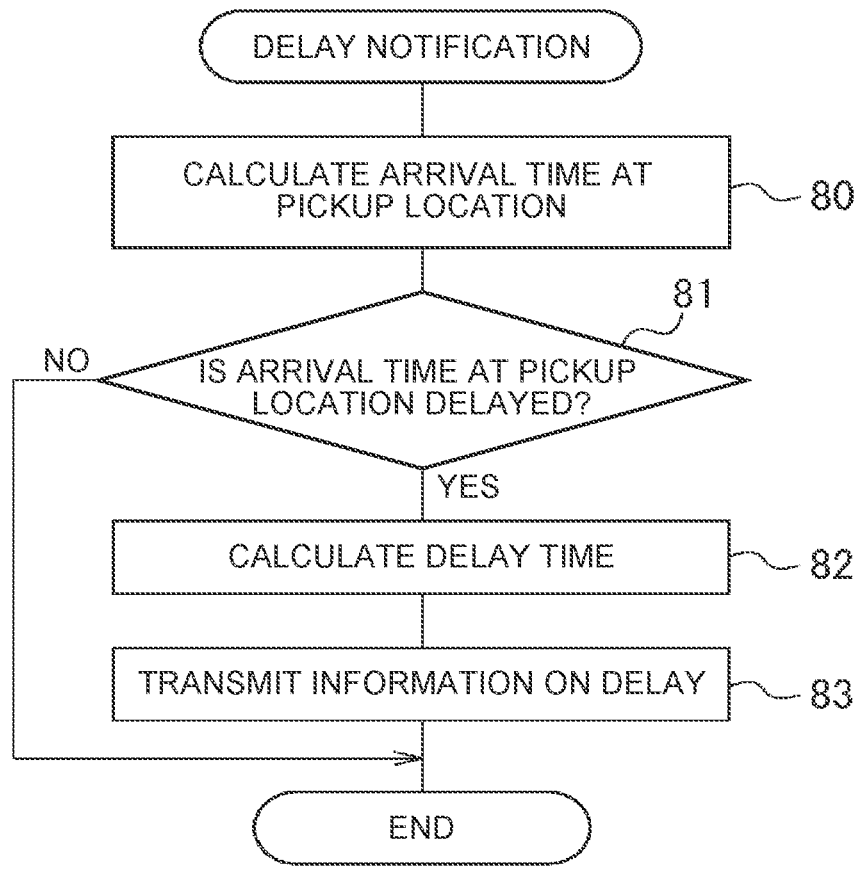
FIG. 8 is a flowchart for performing delay notification.

FIG. 8 shows a delay notification routine executed by the electronic control unit 24 of the autonomous vehicle 2 while the autonomous vehicle 2 is waiting at the waiting location. With reference to FIG. 8, first, in step 80, the arrival time at the pickup location is calculated based on, for example, congestion information transmitted from the travel control server 10. Next, in step 81, it is determined whether the calculated arrival time at the pickup location is delayed with respect to the pickup time requested by the user. When it is determined that the arrival time is delayed, the process proceeds to step 82, and the delay time is calculated. Then, in step 83, information on the delay and the delay time is transmitted to the mobile terminal 46 of the user via the communication network.

Figure 9:
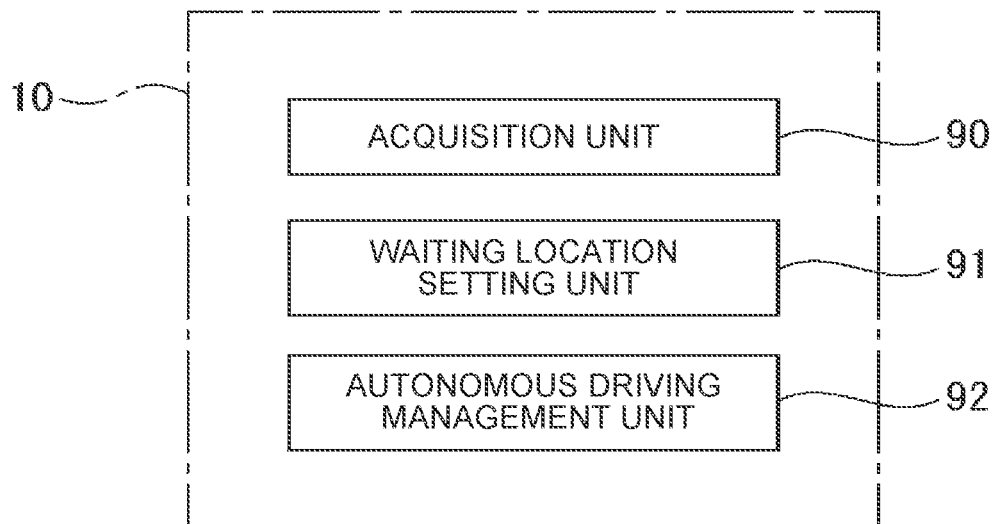
FIG. 9 is a functional configuration diagram of the embodiment according to the present disclosure.

As described above, in the embodiment according to the present disclosure, as shown in a functional configuration diagram of FIG. 9, the autonomous traveling system includes an acquisition unit 90 that acquires the pickup location 5 of the user by the autonomous vehicle 2, a waiting location setting unit 91 that sets the waiting location for temporarily parking the autonomous vehicle 2 between the current position and the pickup location 5 when the autonomous vehicle 2 is moved from the current position to the pickup location 5, and an autonomous driving management unit 92 that autonomously drives the autonomous vehicle 2 from the current position to the waiting location, temporarily parks the autonomous vehicle 2 at the waiting location, and then autonomously drives the autonomous vehicle 2 to the pickup location 5.

In this case, in the embodiment according to the present disclosure, the acquisition unit 90 acquires the pickup time in addition to the pickup location 5 where the user is picked up, and the autonomous driving management unit 92 causes the autonomous vehicle 2 to depart from the waiting location to the pickup location 5 at a time when the autonomous vehicle 2 is predicted to reach the pickup location at the pickup time. Further, in this case, in the embodiment according to the present disclosure, when the arrival time of the autonomous vehicle 2 at the pickup location 5 is delayed, the autonomous driving management unit 92 notifies the user that the arrival time is delayed.

Further, in the embodiment according to the present disclosure, the vehicle autonomous traveling method includes acquiring the pickup location 5 of the user by the autonomous vehicle 2, setting the waiting location for temporarily parking the autonomous vehicle 2 between the current position and the pickup location 5 when the autonomous vehicle 2 is moved from the current position to the pickup location 5, and autonomously driving the autonomous vehicle 2 from the current position to the waiting location, temporarily parking the autonomous vehicle 2 at the waiting location, and then autonomously driving the autonomous vehicle 2 to the pickup location 5.

Further, in the embodiment according to the present disclosure, a program that causes a computer to perform functions include acquiring the pickup location 5 of the user by the autonomous vehicle 2, setting the waiting location for temporarily parking the autonomous vehicle 2 between the current position and the pickup location 5 when the autonomous vehicle 2 is moved from the current position to the pickup location 5, and autonomously driving the autonomous vehicle 2 from the current position to the waiting location, temporarily parking the autonomous vehicle 2 at the waiting location, and then autonomously driving the autonomous vehicle 2 to the pickup location 5. The program is an example of a storage medium.

Next, second to fourth embodiments, which are modifications of the first embodiment described above, will be described in order. In these second to fourth embodiments, only the pickup requesting method shown in FIG. 4 and the pickup processing routine shown in FIG. 5 are different from those shown in the first embodiment, and the pickup command routine shown in FIG. 6, the autonomous driving control routine shown in FIG. 7, and the delay notification routine shown in FIG. 8 are the same as those shown in the first embodiment. Therefore, the description of the pickup command routine, the autonomous driving control routine, and the delay notification routine used in the second to fourth embodiments will be omitted. Further, the pickup requesting method and the pickup processing routine in the second to fourth embodiments have the same parts as the pickup requesting method shown in FIG. 4 and the pickup processing routine shown in FIG. 5, respectively. The same parts are designated by the same reference signs and the description thereof will be omitted.

First, the second embodiment according to the present disclosure will be described. In this first embodiment, travel of the autonomous vehicle 2 is controlled such that the autonomous vehicle 2 reaches the pickup location 5 at the pickup time. However, in reality, the user does not always reach the pickup location 5 exactly at the pickup time. Therefore, in this second embodiment, the position information on the user is acquired from the mobile terminal 46 of the user, and the time when the user reaches the pickup location 5 is predicted based on the acquired position information on the user, and the time when the user reaches the pickup location 5 is set as the pickup time to cause the autonomous vehicle to depart from the waiting location.

Figure 10:
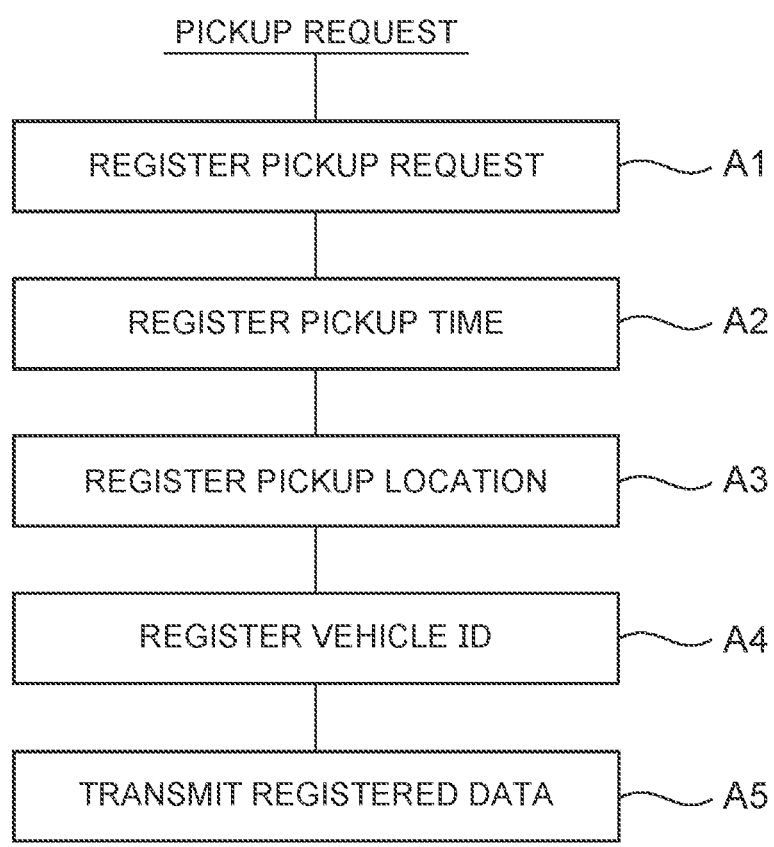
FIG. 10 is a diagram for describing a pickup requesting method in a second embodiment.
Figure 11:
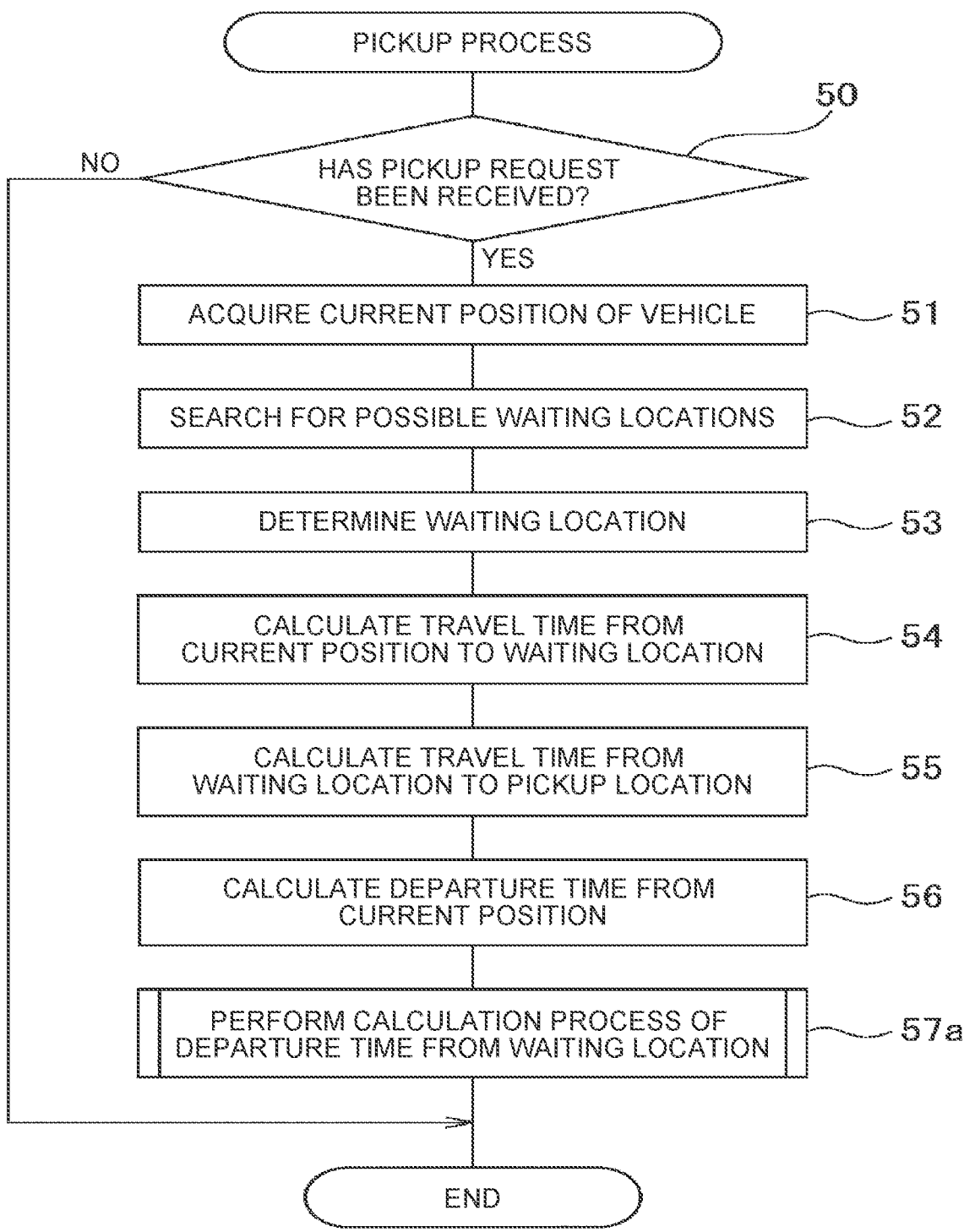
FIG. 11 is a flowchart for performing a pickup process in the second embodiment.
Figure 12:
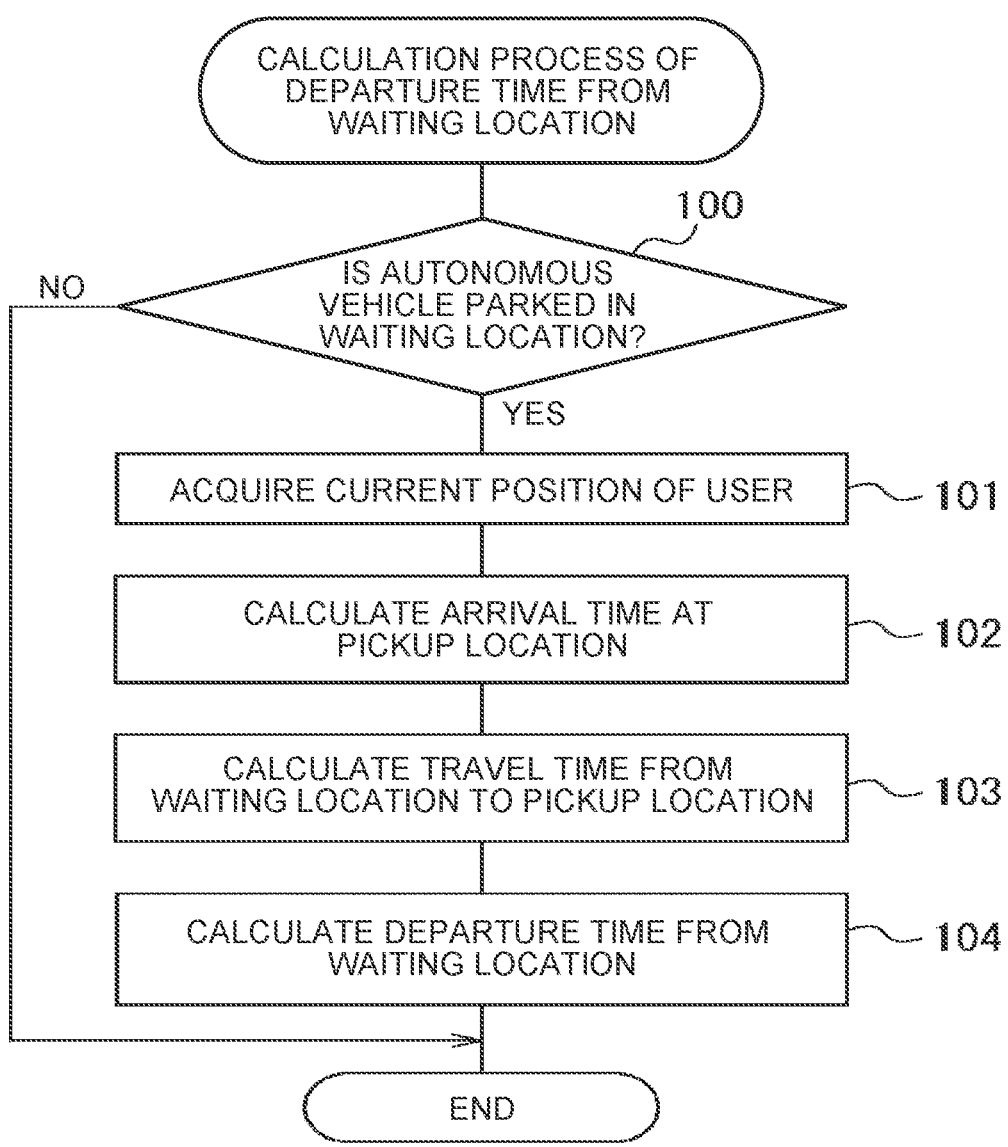
FIG. 12 is a flowchart for performing a pickup process in the second embodiment.

A pickup requesting method used to execute this second embodiment is shown in FIG. 10, and a pickup processing routine used to execute the second embodiment is shown in FIGS. 11 and 12. With reference to the pickup requesting method shown in FIG. 10, the pickup requesting method is the same as the pickup requesting method in the first embodiment shown in FIG. 4. Therefore, the description of the pickup requesting method shown in FIG. 10 will be omitted.

On the other hand, steps 50 to 56 of the pickup processing routine shown in FIG. 11 are the same as steps 50 to 56 of the pickup processing routine in the first embodiment shown in FIG. 5, and the pickup processing routine shown in FIG. 11 is different from the pickup processing routine shown in FIG. 5 only in step 57a in the pickup processing routine shown in FIG. 11. Therefore, as for the pickup processing routine shown in FIG. 11, only step 57a will be described. As shown in FIG. 11, in step 57a, the calculation process of the departure time from the waiting location of the autonomous vehicle 2 is performed, and the calculation process of the departure time from the waiting location of the autonomous vehicle 2 is shown in FIG. 12.

With reference to FIG. 12, first, in step 100, it is determined whether the autonomous vehicle 2 is parked in the waiting location. When it is determined that the autonomous vehicle 2 is not parked in the waiting location, the processing cycle is terminated. On the contrary, when it is determined that the autonomous vehicle 2 is parked in the waiting location, the process proceeds to step 101, and the current position of the user is acquired from the mobile terminal 46 of the user. Then, in step 102, the predicted arrival time of the user at the pickup location 5 is calculated based on the distance between the current position of the user and the pickup location 5 and the predicted walking speed of the user.

Next, in step 103, the travel time of the autonomous vehicle 2 from the waiting location to the pickup location 5 is calculated based on the map information or the like stored in the memory 43 of the electronic control unit 40. Next, in step 104, the departure time from the waiting location of the autonomous vehicle 2 is calculated. When the departure time from the waiting location of the autonomous vehicle 2 is calculated, the autonomous driving start command is generated to the autonomous vehicle 2 in the pickup command routine shown in FIG. 6, and the autonomous driving of the autonomous vehicle 2 is started.

Next, a third embodiment according to the present disclosure will be described. Now, depending on the user, for example, in order to avoid rain, the user may wait at a waiting location in a room and wish to move to the pickup location when the pickup time is approaching. In addition, the user knows the arrival time at the station, and as soon as the user reaches the station, the user may start heading to the pickup location 5. In such a case, it is complicated because the moving time to the pickup location 5 must be calculated in order to register the pickup time 5, and it is easier to register the time that does not require the time calculation, such as the time when the user starts heading to the pickup location 5 from the waiting location or the arrival time at the station.

Therefore, in this third embodiment, a location where the user is present before the user heads to the pickup location, such as the waiting location in the room or the arrival station, and the time when the user starts heading to the pickup location from the location where the user is present are registered. As described above, the location where the user is present before the user heads to the pickup location and the time when the user starts heading to the pickup location from this location become the reference of the time when the user reaches the pickup location. Therefore, in the embodiment according to the present disclosure, the location where the user is present before the user heads to the pickup location is referred to as a reference location, and the time when the user starts heading to the pickup location from the reference location is referred to as a reference time.

When the reference location and the reference time are used, in this third embodiment, the reference location where the user is present before the user heads to the pickup location 5 and the reference time when the user starts heading to the pickup location 5 from the reference location are acquired. Based on the acquired reference location and reference time, the time when the user reaches the pickup location 5 is predicted, the time when the user reaches the pickup location 5 is set as the pickup time, and the autonomous vehicle 2 is caused to depart from the waiting location. In this case, this reference location is, for example, a waiting location where the user is waiting before heading to the pickup location 5, and the reference time is a time when the user starts heading to the pickup location 5 from this waiting location.

Figure 13:
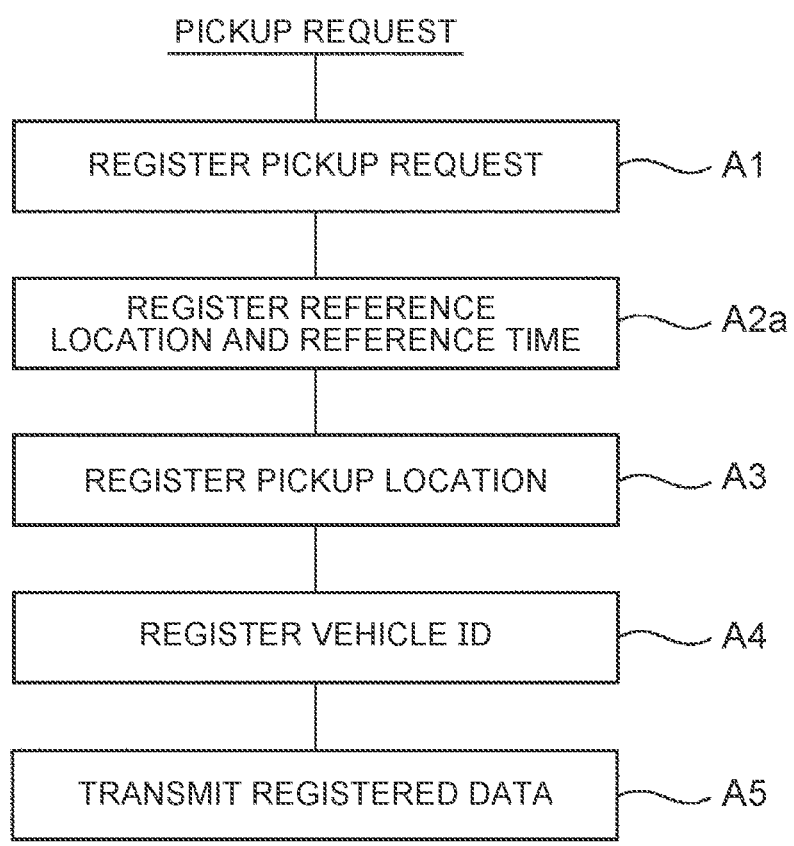
FIG. 13 is a diagram for describing a pickup requesting method in a third embodiment.
Figure 14:
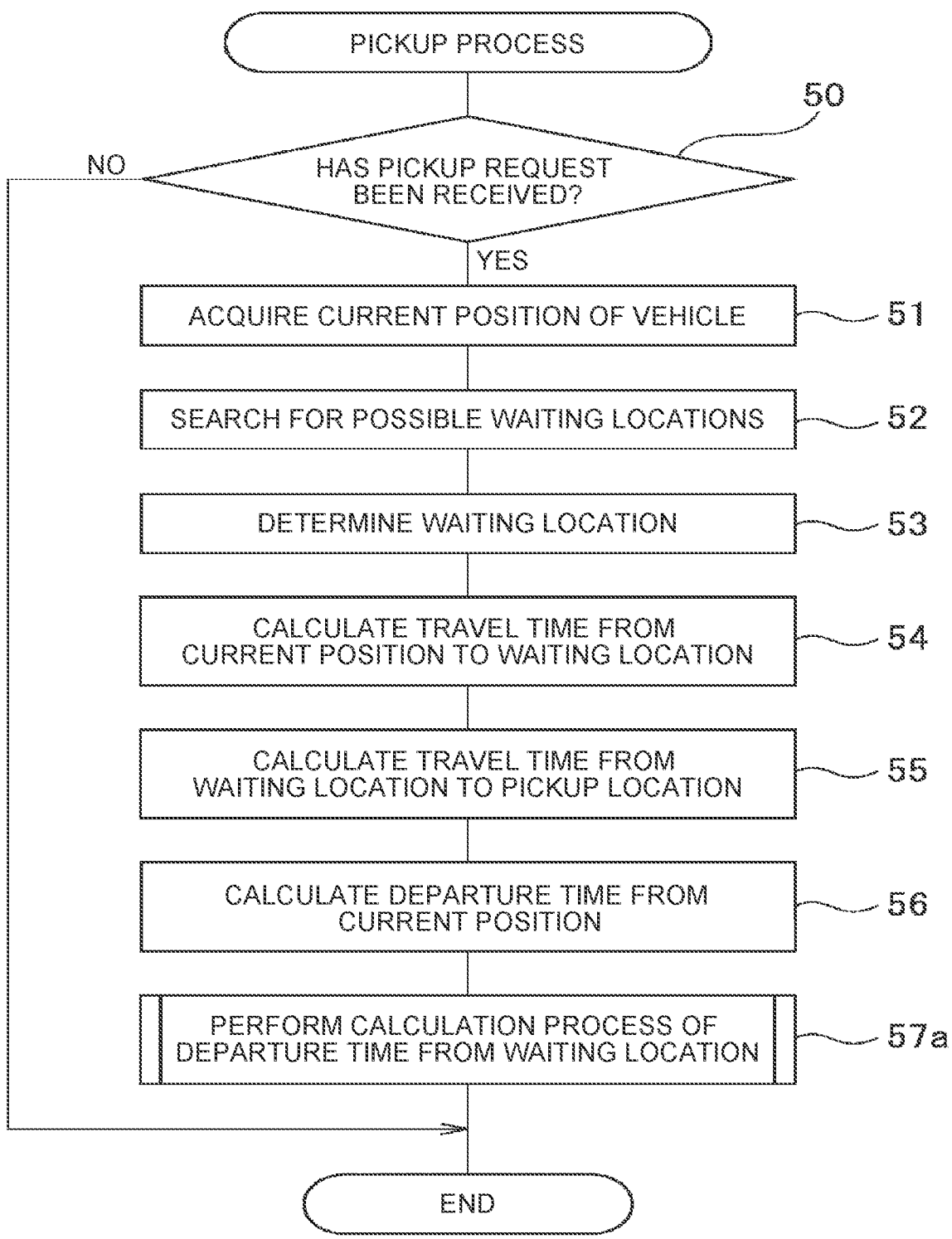
FIG. 14 is a flowchart for performing a pickup process in the third embodiment.
Figure 15:
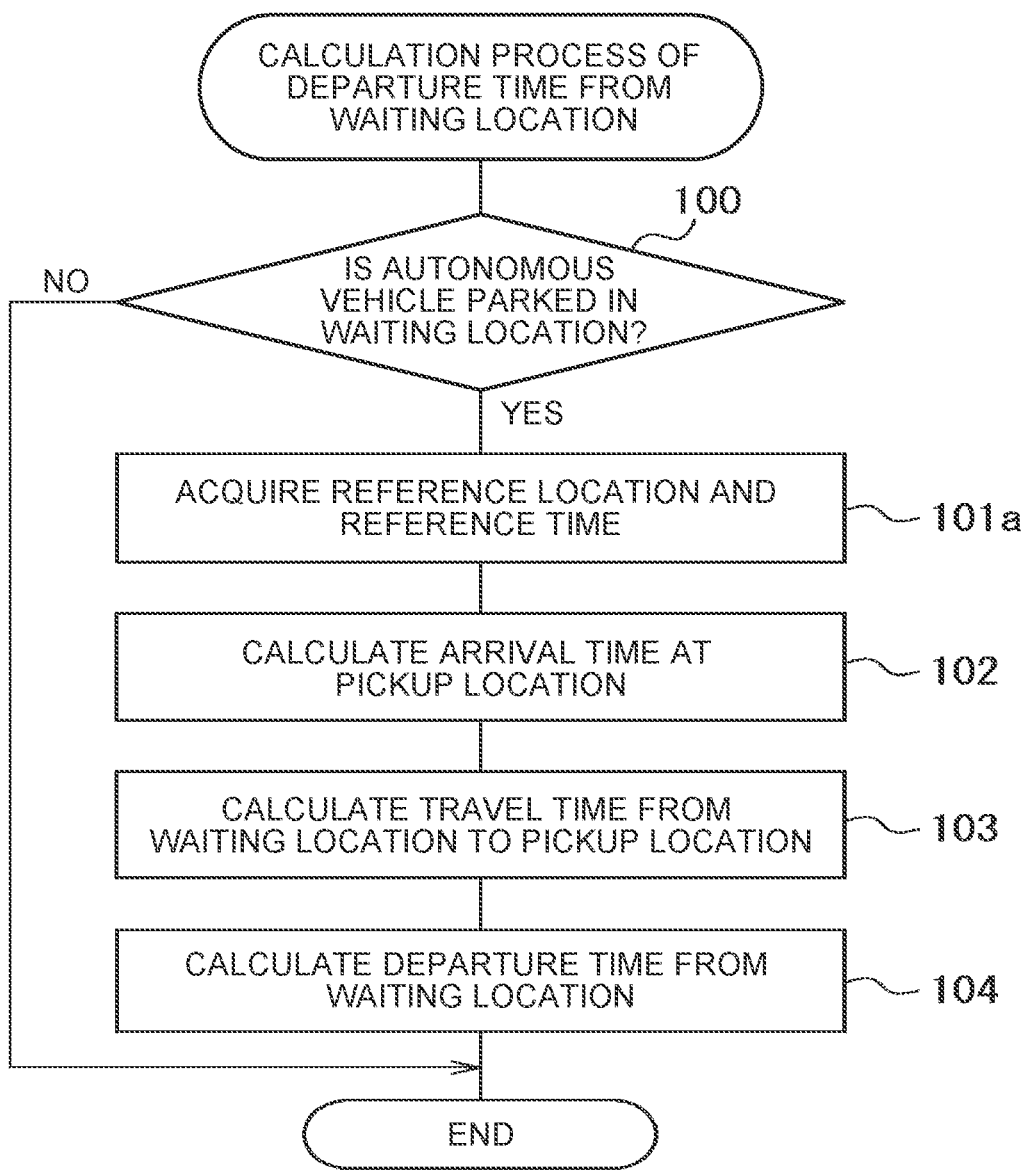
FIG. 15 is a flowchart for performing a pickup process in the third embodiment.

A pickup requesting method used to execute this third embodiment is shown in FIG. 13, and a pickup processing routine used to execute the third embodiment is shown in FIGS. 14 and 15. With reference to the pickup requesting method shown in FIG. 13, the pickup requesting methods A1, A3, A4, and A5 shown in FIG. 13 are the same as the pickup requesting methods A1, A3, A4 and A5 in the first embodiment shown in FIG. 5, and the pickup requesting method shown in FIG. 13 is different from the pickup requesting method shown in FIG. 5 only in a requesting method A2*a* shown in FIG. 13. Therefore, as for the pickup requesting method shown in FIG. 13, only the requesting method A2*a* will be described. As shown in FIG. 13, in the requesting method A2*a*, the reference location where the user is present before heading to the pickup location 5 and the reference time when the user starts heading to the pickup location 5 from this reference location are registered.

On the other hand, with reference to the pickup processing routines shown in FIGS. 14 and 15, steps 50 to 56 of the pickup processing routine shown in FIG. 14 are the same as steps 50 to 56 of the pickup processing routine in the second embodiment shown in FIG. 11. The pickup processing routine shown in FIG. 14 is different from the pickup processing routine in the second embodiment shown in FIGS. 11 and 12 only in the content of step 57*a* in the pickup processing routine shown in FIG. 14, that is, the calculation process of the departure time from the waiting location of the autonomous vehicle 2 shown in FIG. 15. Further, the calculation process of the departure time from the waiting location of the autonomous vehicle 2 shown in FIG. 15 is different from the calculation process of the departure time from the waiting location of the autonomous vehicle 2 shown in FIG. 12 only in step 101*a*. Therefore, as for the pickup processing routine in the third embodiment shown in FIGS. 14 and 15, only portions related to step 101*a* will be described.

That is, with reference to FIG. 15, in step 101*a*, the reference location where the user is present before heading to the pickup location 5 and the reference time when the user starts heading to the pickup location 5 from this reference location are acquired. Then, in step 102, the predicted arrival time of the user at the pickup location 5 is calculated based on the reference location and the reference time and the predicted walking speed of the user. Next, in step 103, the travel time of the autonomous vehicle 2 from the waiting location to the pickup location 5 is calculated based on the map information or the like stored in the memory 43 of the electronic control unit 40. Next, in step 104, the departure time from the waiting location of the autonomous vehicle 2 is calculated. When the departure time from the waiting location of the autonomous vehicle 2 is calculated, the autonomous driving start command is generated to the autonomous vehicle 2 in the pickup command routine shown in FIG. 6, and the autonomous driving of the autonomous vehicle 2 is started.

Next, a fourth embodiment according to the present disclosure will be described. This fourth embodiment shows a case where the user can select priority regarding pickup. In this case, for example, the priority is classified into the highest priority 1, the next highest priority 2, and the lowest priority 3, and the user can select any of the priorities. In this case, for example, a user with a high degree of disability selects the priority 1, a user with a relatively low degree of disability selects the priority 2, and a user without disability selects the priority 3.

On the other hand, regarding the waiting time of the user at the pickup location 5, a user who requests no waiting time selects the priority 1, a user who requests a relatively short waiting time selects the priority 2, and a user who accepts a relatively long waiting time selects the priority 3. In this case, for example, a usage fee of the autonomous traveling system according to the present disclosure is set to be high to the user in the order of the priority 1, the priority 2, and the priority 3, or a point is given to the users of the priority 3 and the priority 2, and a larger point is given to the user of the priority 3 than the user of the priority 2. In this fourth embodiment, when the pickup times of the users overlap, the pickup time of the user with the high priority is prioritized.

Figure 16:
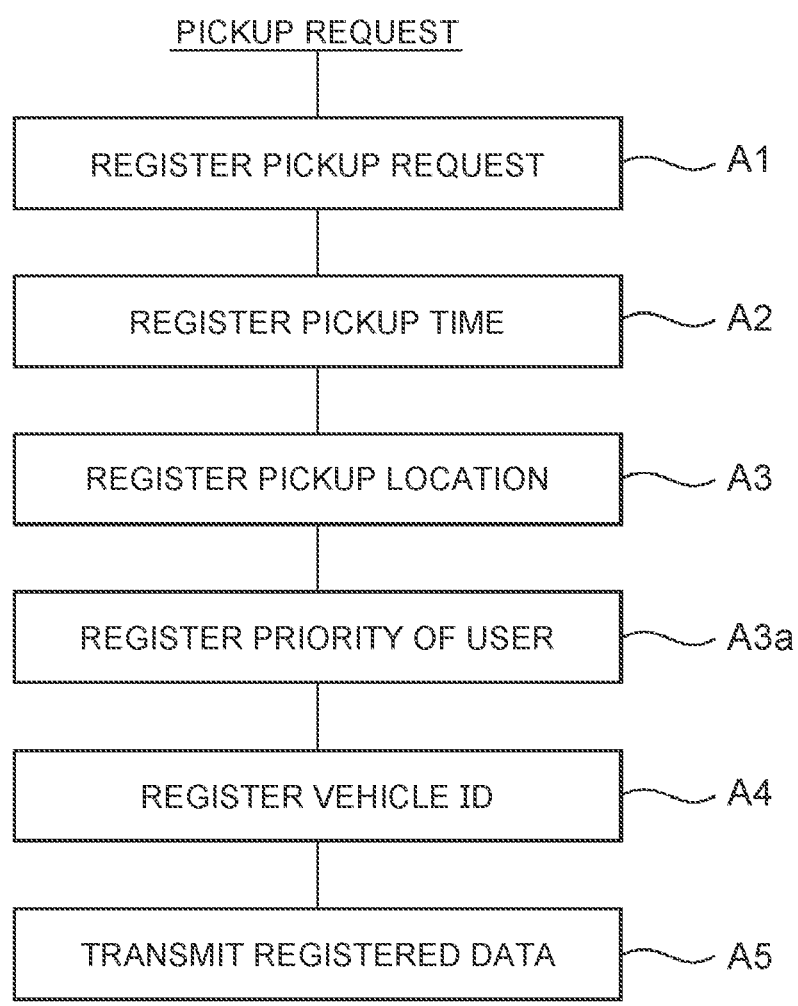
FIG. 16 is a diagram for describing a pickup requesting method in a fourth embodiment.

A pickup requesting method used to execute this fourth embodiment is shown in FIG. 16, and a pickup processing routine used to execute the fourth embodiment is shown in FIG. 17. With reference to the pickup requesting method shown in FIG. 16, the pickup requesting methods A1, A2, A3, A4, and A5 shown in FIG. 16 are the same as the pickup requesting methods A1, A2, A3, A4 and A5 in the first embodiment shown in FIG. 5, and the pickup requesting method shown in FIG. 16 is different from the pickup requesting method shown in FIG. 5 only in that a requesting method A3a is added in the pickup requesting method shown in FIG. 16. Therefore, as for the pickup requesting method shown in FIG. 16, only the requesting method A3a will be described. As shown in FIG. 16, in this requesting method A3a, the priority of the user is registered.

On the other hand, steps 50 to 56 of the pickup processing routine shown in FIG. 17 are the same as steps 50 to 56 of the pickup processing routine in the first embodiment shown in FIG. 5, and the pickup processing routine shown in FIG. 11 is different from the pickup processing routine shown in FIG. 5 only in steps 57a and 57b in the pickup processing routine shown in FIG. 17. Therefore, as for the pickup processing routine shown in FIG. 17, only steps 57a and 57b will be described.

As shown in FIG. 17, in step 57a, the priority of another user whose pickup time overlaps with the pickup time of the user, for example, the priority of another user whose pickup time is within a certain time range is searched. Next, in step 57b, the departure time from the waiting location of the autonomous vehicle 2 according to the priority is calculated. For example, when the priority of the other user is higher, the departure time from the waiting location is set to be a time slightly delayed from the calculated departure time. When the departure time from the waiting location of the autonomous vehicle 2 is calculated in step 57b, the autonomous driving start command is generated to the autonomous vehicle 2 in the pickup command routine shown in FIG. 6, and the autonomous driving of the autonomous vehicle 2 is started.

Figure 18A:
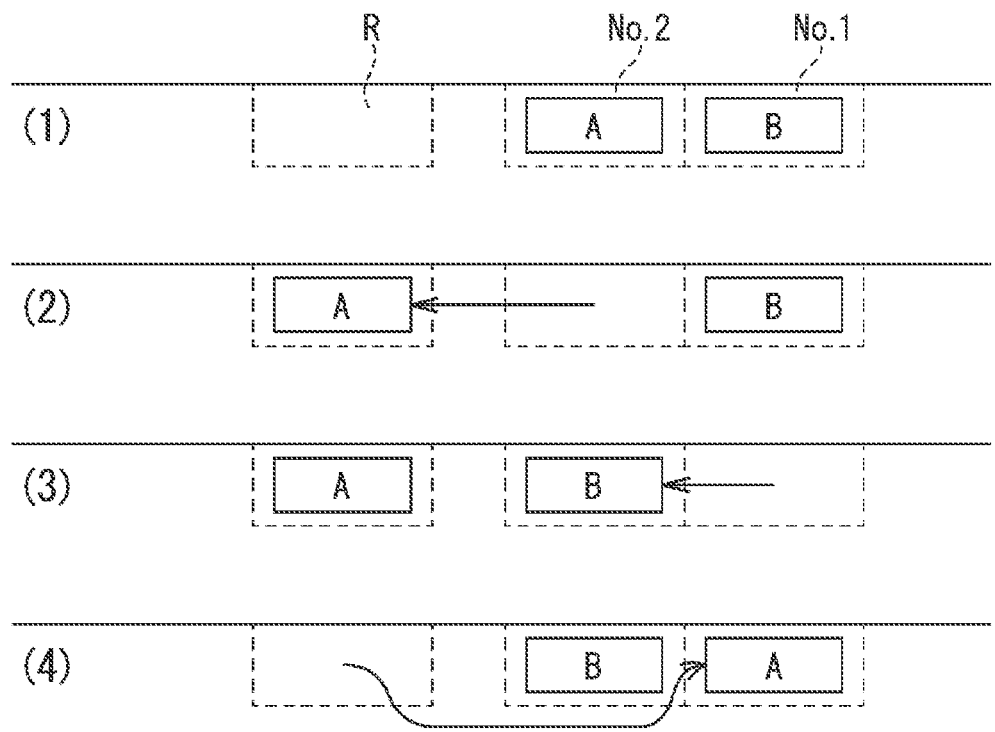
FIG. 18A is a diagram for describing a modification of the fourth embodiment.

Next, a modification of the fourth embodiment will be described with reference to FIGS. 18A to 19. In this modification, the use of a pickup location that is convenient for boarding of the vehicle is prioritized to the user with the high priority. An example of the preferential use of the pickup location that is convenient for boarding of the vehicle will be described with reference to FIG. 18A. In FIG. 18A, the numerals No. 1 and No. 2 indicate stop spaces 6 at the pickup location, and when the stop space 6 of No. 1 is more convenient than the stop space 6 of No. 2 in terms of boarding of the vehicle, for example, the example shown in FIG. 1 shows a case in which the stop space 6 of No. 1 is closer to the station 3 than the stop space 6 of No. 2 is. Further, in FIG. 18A, the alphabets A and B indicate the autonomous vehicles stopped in the stop spaces 6, and FIG. 18A shows a case in which the priority of the user of the autonomous vehicle A is higher than the priority of the user of the autonomous vehicle B.

In this modification, when the autonomous vehicle B stops at the stop space 6 of No. 1 that is convenient for boarding of the vehicle, and the autonomous vehicle A stops at the stop space 6 of No. 2 that is not convenient for boarding of the vehicle, as shown in (1) of FIG. 18A, the autonomous vehicle A is moved in front of the autonomous vehicle B such that the autonomous vehicle A stops at the stop space 6 of No. 1 that is convenient for boarding of the vehicle as shown in (4) of FIG. 18A after the state thereof is changed from the state (2) of FIG. 18A to the state (3) of FIG. 18A. In this case, in the example shown in FIG. 18A, as shown in (2) of FIG. 18A, the autonomous vehicle A is moved rearward to a stop space R by autonomous driving, and then as shown in (3) of FIG. 18A, the autonomous vehicle B is moved rearward to the stop space 6 of No. 2 by autonomous driving, and then as shown in (4) of FIG. 18A, the autonomous vehicle A is moved forward to the stop space 6 of No. 1 by autonomous driving.

Figure 18B:
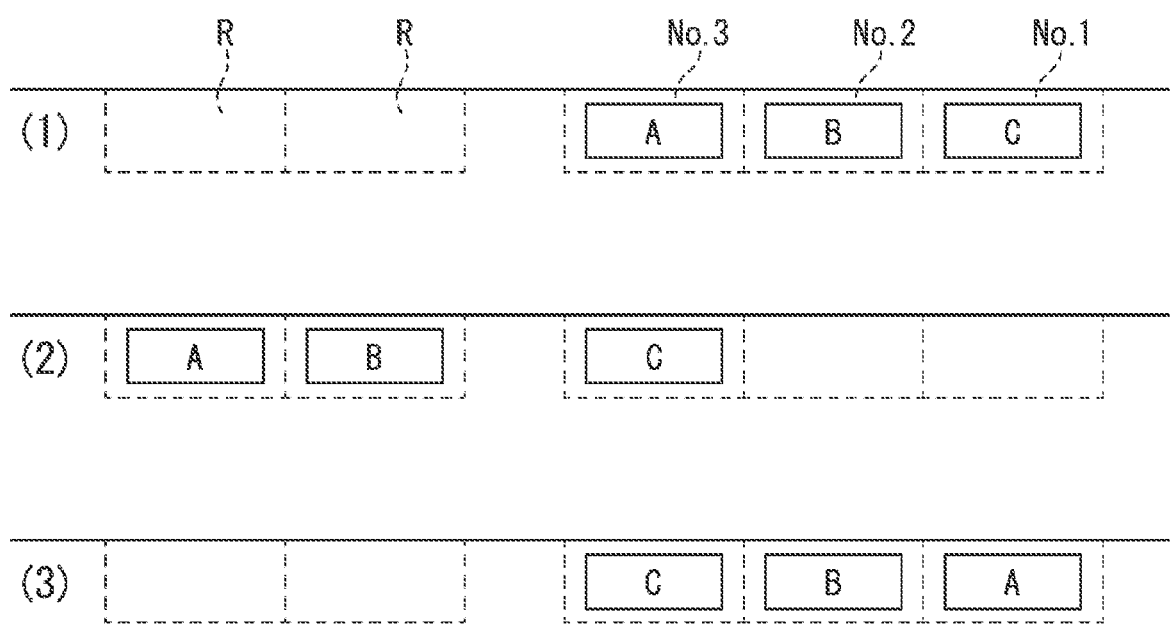
FIG. 18B is a diagram for describing a modification of the fourth embodiment.

On the other hand, FIG. 18B shows a case in which a stop space 6 of No. 3 that is less convenient for boarding of the vehicle than the stop space 6 of No. 2 is present, in addition to the stop spaces 6 of No. 1 and No. 2, and the autonomous vehicle A, the autonomous vehicle B, and an autonomous vehicle C with lower priority of the user than the priority of the user of the autonomous vehicle B stop at the stop space 6 of No. 3, the stop space 6 of No. 2, and the stop space 6 of No. 1, respectively. Also in this example, the autonomous vehicles A, B, and C are moved by autonomous driving so as to be in a state in (3) of FIG. 18B after the state thereof is changed from the state of (1) of FIG. 18B to the state of (2) of FIG. 18B.

Figure 19:
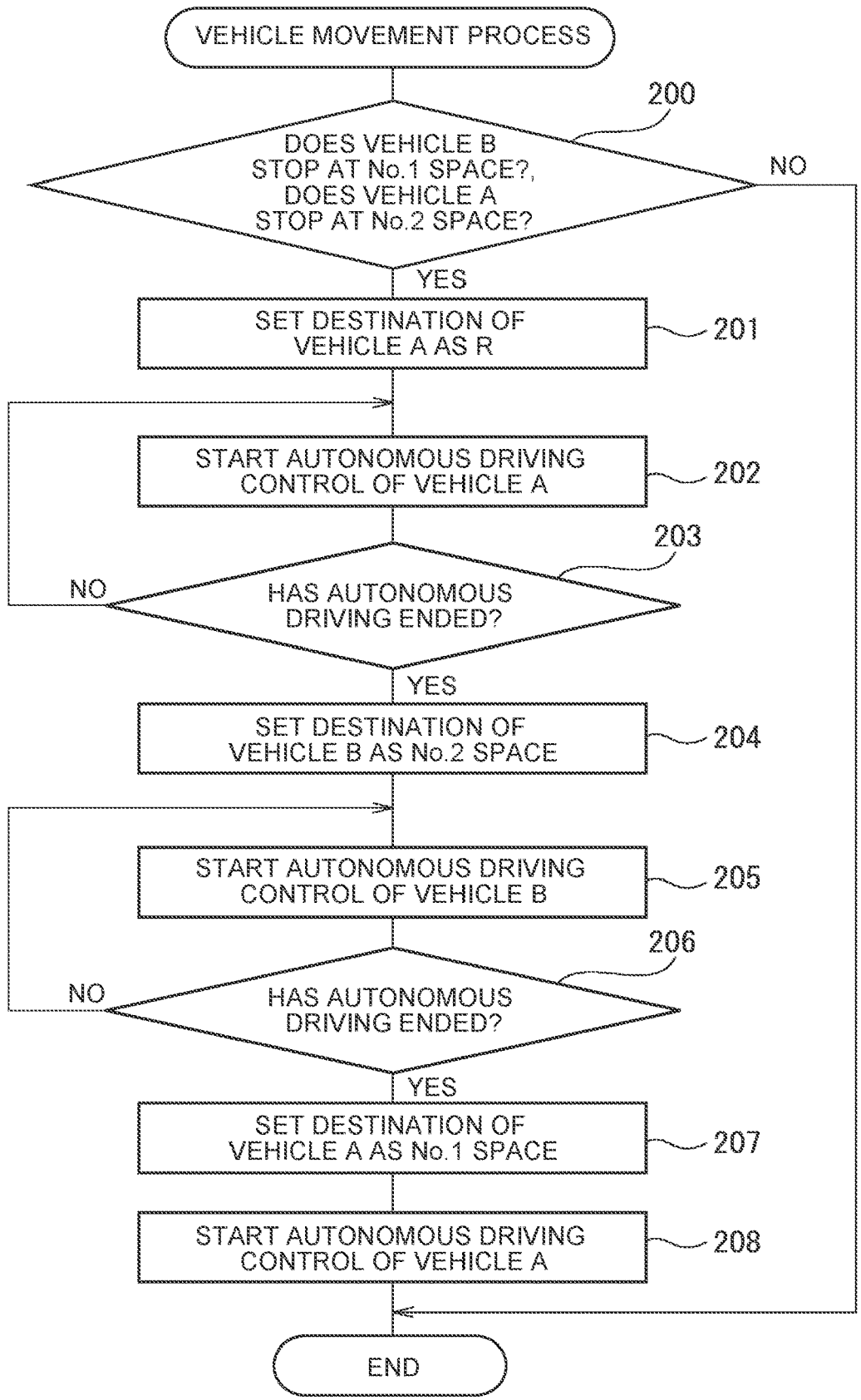
FIG. 19 is a flowchart for performing a movement process of an autonomous vehicle.

FIG. 19 shows a movement processing routine of the autonomous vehicle executed in the electronic control unit 40 of the travel control server 10 in order to execute this modification. Note that this routine shows a routine for executing the example shown in FIG. 18A, and the routine for executing the example shown in FIG. 18B is also a similar routine.

With reference to FIG. 19, first, in step 200, it is determined whether the autonomous vehicle B stops at the stop space 6 of No. 1, and the autonomous vehicle A stops at the stop space 6 of No. 2 based on the image data captured by a surveillance camera installed at the pickup location, for example. When it is determined that the autonomous vehicle B stops at the stop space 6 of No. 1 and the autonomous vehicle A does not stop at the stop space 6 of No. 2, the processing cycle is terminated. On the contrary, when it is determined that the autonomous vehicle B stops at the stop space 6 of No. 1 and the autonomous vehicle A stops at the stop space 6 of No. 2, the process proceeds to step 201.

In step 201, the destination of the autonomous vehicle A is set as the stop space R, and then in step 202, the autonomous driving control shown in FIG. 7 is executed for the autonomous vehicle A. Next, in step 203, it is determined whether the autonomous driving has ended, that is, whether the movement of the autonomous vehicle A to the stop space R has ended. When it is determined that the movement of the autonomous vehicle A to the stop space R has ended, the process proceeds to step 204. In step 204, the destination of the autonomous vehicle B is set as the stop space 6 of No. 2, and then, in step 205, the autonomous driving control shown in FIG. 7 is executed for the autonomous vehicle B. Next, in step 206, it is determined whether the autonomous driving has ended, that is, the movement of the autonomous vehicle B to the stop space 6 of No. 2 has ended. When it is determined that the movement of the autonomous vehicle B to the stop space 6 of No. 2 has ended, the process proceeds to step 207. In step 207, the destination of the autonomous vehicle A is set as the stop space 6 of No. 1, and then, in step 208, the autonomous driving control shown in FIG. 7 is executed for the autonomous vehicle A.

What is claimed is:

1. A vehicle autonomous traveling system comprising:
an autonomous vehicle, including a first processor that is configured to control travel of the autonomous vehicle; and
a server including a second processor that is configured to:
receive a pickup request including a pickup location, a pickup time, and a priority level regarding pickup from a user of the autonomous vehicle,
based upon receiving the pickup request and before the vehicle travels to the pickup location, search for an available parking space that is closer to the pickup location than a current position of the autonomous vehicle at a time the pickup request is received, wherein the current position is different from the pickup location and the available parking space is a location for the autonomous vehicle to temporarily park before traveling to the pickup location, and
output a travel command, that includes the available parking space, to the autonomous vehicle,
wherein based upon receiving the travel command from the server, the first processor of the autonomous vehicle is configured to:
control the autonomous vehicle to travel from the current position to the available parking space so as to temporarily park in the available parking space,
wherein the pickup location has a plurality of pickup spaces, and a boarding convenience level for each of the plurality of pickup spaces is uniquely ranked from highest to lowest,
select a pickup space from among the plurality of pickup spaces in the pickup location, which has a boarding convenience level associated with the priority level of the user, so that a user with a highest priority level uses the pickup space having the highest boarding convenience level, and
subsequently control the autonomous vehicle to depart from the available parking space at a time that will cause the autonomous vehicle to reach the selected pickup space in the pickup location at the pickup time.

2. The vehicle autonomous traveling system according to claim 1, wherein the server is configured to acquire position information on the user, and to predict a time when the user reaches the selected pickup space in the pickup location based on the acquired position information on the user, and sets the time when the user reaches the selected pickup space in the pickup location as the pickup time, and the first processor of the autonomous vehicle controls the autonomous vehicle to depart from the available parking space so as to reach the selected pickup space in the pickup location at the pickup time.

3. The vehicle autonomous traveling system according to claim 1, wherein the server is configured to acquire a reference location where the user is present before the user heads to the selected pickup space in the pickup location and a reference time when the user starts heading from the reference location to the selected pickup space in the pickup location, and the second processor is configured to predict the time when the user reaches the the selected pickup space in pickup location based on the acquired reference location and reference time, and sets the time when the user reaches the selected pickup space in the pickup location as the pickup time, and the first processor of the autonomous vehicle controls the autonomous vehicle to depart from the available parking space so as to reach the selected pickup space in the pickup location at the pickup time.

4. The vehicle autonomous traveling system according to claim 3, wherein the reference location is a waiting location where the user is waiting before the user heads to the selected pickup space in the pickup location, and the reference time is a time when the user starts heading to the selected pickup space in the pickup location from the waiting location of the user.

5. The vehicle autonomous traveling system according to claim 1, wherein, when pickup times overlap between the user and a second user, the server is configured to prioritize a pickup time of the user and the second user with a highest priority level.

6. The vehicle autonomous traveling system according to claim 1, wherein when an arrival time of the autonomous vehicle at the selected pickup space in the pickup location is delayed, the server is configured to notify the user that the arrival time is delayed.

7. A vehicle autonomous traveling method comprising:
receiving a pickup request including a pickup location, a pickup time, and a priority level regarding pickup from a user of the autonomous vehicle;
based upon receiving the pickup request and before the vehicle travels to the pickup location, searching for an available parking space that is closer to the pickup location than a current position of the autonomous vehicle at a time the pickup request is received, wherein the current position is different from the pickup location and the available parking space is a location for the autonomous vehicle to temporarily park before traveling to the pickup location;
outputting a travel command that includes the available parking space, to the autonomous vehicle;
wherein based upon the travel command being output, control the autonomous vehicle to travel from the current position to the available parking space so as to temporarily park in the available parking space,
wherein the pickup location has a plurality of pickup spaces, and a boarding convenience level for each of the plurality of pickup spaces is uniquely ranked from highest to lowest,
selecting a pickup space from among the plurality of pickup spaces in the pickup location, which has a boarding convenience level associated with the priority level of the user, so that a user with a highest priority level uses the pickup space having the highest boarding convenience level; and
subsequently control the autonomous vehicle to depart from the available parking space at a time that will cause the autonomous vehicle to reach the selected pickup space in the pickup location at the pickup time.

8. A non-transitory storage medium storing a program that causes a computer to perform functions comprising:
receiving a pickup request including a pickup location, a pickup time, and a priority level regarding pickup from a user of the autonomous vehicle;
based upon receiving the pickup request and before the vehicle travels to the pickup location, searching for an available parking space that is closer to the pickup location than a current position of the autonomous vehicle at a time the pickup request is received, wherein the current position is different from the pickup location and the available parking space is a location for the autonomous vehicle to temporarily park before traveling to the pickup location;
outputting a travel command that includes the available parking space, to the autonomous vehicle;

wherein based upon the travel command being output, control the autonomous vehicle to travel from the current position to the available parking space so as to temporarily park in the available parking space, wherein the pickup location has a plurality of pickup spaces, and a boarding convenience level for each of the plurality of pickup spaces is uniquely ranked from highest to lowest, selecting a pickup space from among the plurality of pickup spaces in the pickup location, which has a boarding convenience level associated with the priority level of the user, so that a user with a highest priority level uses the pickup space having the highest boarding convenience level; and subsequently control the autonomous vehicle to depart from the available parking space at a time that will cause the autonomous vehicle to reach the selected pickup space in the pickup location at the pickup time.

9. The vehicle autonomous traveling system according to claim 1, wherein the server is configured to cause a second autonomous vehicle for a second user to move from a current pickup space to another pickup space in the pickup location when a priority level of the second user is lower than a boarding convenience level associated with the current pickup space and a priority level of the user is higher than the second user.

10. The vehicle autonomous traveling system according to claim 9, wherein the server is configured to cause the second autonomous vehicle to move to the another pickup space temporarily until the user with the priority level that is higher departs from the current pickup space.

11. The vehicle autonomous traveling system according to claim 1, wherein the boarding convenience level for each of the plurality of pickup spaces is uniquely ranked from highest to lowest based on a shortest to longest distance from a station associated with the pickup location, so that among the plurality of pickup spaces, the pickup space with the highest convenience level is located at the shortest distance from the station.

\* \* \* \* \*